(12) United States Patent
Sopko et al.

(10) Patent No.: US 7,854,681 B2
(45) Date of Patent: Dec. 21, 2010

(54) SYSTEM FOR CONTROLLING A MACHINE WITH A CONTINUOUSLY VARIABLE TRANSMISSION

(75) Inventors: Thomas M. Sopko, East Peoria, IL (US); Brian D. Kuras, Metamora, IL (US); Michael J. Barngrover, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 788 days.

(21) Appl. No.: 11/797,014

(22) Filed: Apr. 30, 2007

(65) Prior Publication Data

US 2008/0269011 A1  Oct. 30, 2008

(51) Int. Cl.
 *F16H 59/14* (2006.01)
 *F16H 59/54* (2006.01)
(52) U.S. Cl. .......................... 477/34; 477/92
(58) Field of Classification Search .............. 477/34, 477/68, 92
 See application file for complete search history.

(56) References Cited

U.S. PATENT DOCUMENTS

| 3,890,360 | A | * | 6/1975 | Pruvot et al. .................. 60/431 |
| 4,125,797 | A | | 11/1978 | Bader et al. |
| 4,531,431 | A | * | 7/1985 | Dreher et al. .................. 477/2 |
| 4,850,250 | A | | 7/1989 | Nehmer et al. |
| 4,989,474 | A | | 2/1991 | Cicotte et al. |
| 5,078,024 | A | | 1/1992 | Cicotte et al. |
| 5,086,865 | A | | 2/1992 | Tanaka et al. |
| 5,088,041 | A | * | 2/1992 | Tanaka et al. .................. 701/70 |
| 5,775,784 | A | | 7/1998 | Koga et al. |
| 5,915,801 | A | | 6/1999 | Taga et al. |
| 6,161,071 | A | | 12/2000 | Shuman et al. |
| 6,314,357 | B1 | | 11/2001 | Kon et al. |
| 6,492,785 | B1 | | 12/2002 | Kasten et al. |
| 6,537,169 | B1 | | 3/2003 | Morii |
| 6,640,179 | B2 | | 10/2003 | Katakura et al. |
| 6,827,167 | B2 | | 12/2004 | Cikanek et al. |
| 2004/0129487 | A1 | | 7/2004 | Shabana et al. |

FOREIGN PATENT DOCUMENTS

| EP | 1 036 925 | | 9/2000 |
| EP | 1 493 609 | A1 | 1/2005 |
| WO | WO 2006/109127 | | 10/2006 |

* cited by examiner

*Primary Examiner*—Sherry Estremsky
(74) *Attorney, Agent, or Firm*—Finnegan, Henderson, Farabow, Garrett & Dunner LLP

(57) ABSTRACT

A system for controlling a machine with a continuously variable transmission includes a first control device configured to produce a first signal based on a first operator input and a second control device configured to produce a second signal based on a second operator input. The system also includes a control system configured to receive the first and second signals from the first and second control devices and generate a raw torque value based on the first and second signals. The control system is also configured to determine an output torque value based on the raw torque value and transmit the output torque value to the transmission to control the transmission.

21 Claims, 7 Drawing Sheets

SYSTEM FOR CONTROLLING A MACHINE WITH A CONTINUOUSLY VARIABLE TRANSMISSION

TECHNICAL FIELD

The present disclosure relates generally to a system and method for controlling a machine, and more particularly, to a system and method for controlling a machine with a continuously variable transmission.

BACKGROUND

Conventional propelled machines may generally include an internal combustion engine that is mechanically coupled through a transmission assembly and drive train to the driven wheels or sprockets of the machine. In contrast, propelled machines having electric drive systems include an internal combustion engine that is mechanically coupled to drive a generator that creates electrical power. The power from the generator is then consumed by a motor that is mechanically coupled to drive the wheels or sprockets of the propelled machine. Accordingly, the generator and motor of the electric drive systems can replace the mechanical transmission and drive train of conventional internal combustion engine driven machines. This may result in a propelled machine with superior drive train efficiency and improved propulsion performance, which correlates to a machine having greater fuel economy and reduced emissions.

In one type of conventional mechanical transmission system, a gear selector allows the operator to select between various directions of travel (e.g., forward, neutral, reverse, etc.) and various gear ratios (e.g., first, second, third, fourth gear, etc.) of the mechanical transmission. Machine speed may be controlled by selecting the gear ratio of the transmission. Each gear ratio may correlate, for example, to a predetermined speed range. On the other hand, electric drives are not limited to a finite number of gear ratios and therefore do not provide a similar feature of selecting gear ratios corresponding to predetermined speed ranges.

Furthermore, in one type of a conventional mechanical transmission system, an impeller clutch is connected between the engine and the transmission of the machine, and is actuated through an impeller clutch pedal. When the impeller clutch pedal is depressed, the impeller clutch leaves an engaged state where the full amount of power is transmitted from the engine to the transmission to a disengaged state where the engine power is variably passed to the transmission based on the amount of pedal depression. Upon further depression of the impeller clutch pedal, the impeller clutch decouples the engine from the transmission, and the brakes are engaged to slow the speed of the machine. As a result, the machine's ground speed is reduced for more precise control while the engine speed is maintained at a relatively high rate to enable rapid response of auxiliary equipment operated by the engine. However, with the impeller clutch, power may be dissipated as heat, thereby decreasing drive train efficiency, and it may be more difficult to control the transfer of power to the ground.

U.S. Pat. No. 6,492,785 (the '785 patent) to Kasten et al. describes using an electric drive system instead of a mechanical transmission system with a clutch pedal for reducing torque. The electric drive system of the '785 patent includes a pedal connected to a transducer that forms a clutch command signal associated with the position of the pedal. As the pedal is depressed, the clutch command signal reduces the current supplied to the motor until the torque reaches zero at a nearly fully depressed position of the pedal. Although the system of the '785 patent may disclose using a clutch pedal to limit motor torque, this may also be insufficient to limit the undesired power of the machine as described above.

The disclosed system is directed to overcoming one or more of the problems set forth above.

SUMMARY OF THE INVENTION

In one aspect, the present disclosure is directed to a system for controlling a machine with a continuously variable transmission. The system includes a first control device configured to produce a first signal based on a first operator input and a second control device configured to produce a second signal based on a second operator input. The system also includes a control system configured to receive the first and second signals from the first and second control devices and generate a raw torque value based on the first and second signals. The control system is also configured to determine an output torque value based on the raw torque value and transmit the output torque value to the transmission to control the transmission.

In another aspect, the present disclosure is directed to a system for controlling a machine with a continuously variable transmission. The system includes a selector configured to receive an input from an operator. The operator input specifies a mode of operation, and the mode of operation includes a correlation between at least one speed and at least one torque modifying value. The system also includes a control system configured to determine an output torque value based on the mode of operation specified by the operator and a torque modifying value determined based on the correlation and a sensed speed. The control system is also configured to transmit the output torque value to the transmission to control the transmission.

In yet another aspect, the present disclosure is directed to a method of controlling a machine with a continuously variable transmission. The method includes producing a first signal based on a first operator input and producing a second signal based on a second operator input. The first signal is associated with a reverse torque, and the second signal is associated with a forward torque. The method also includes determining an output torque value based on the first and second signals and transmitting the output torque value to the transmission to control the transmission.

DETAILED DESCRIPTION

Reference will now be made in detail to certain embodiments, which are illustrated in the accompanying drawings. Wherever possible, the same reference numbers will be used throughout the drawings to refer to the same or like parts.

Figure 1:
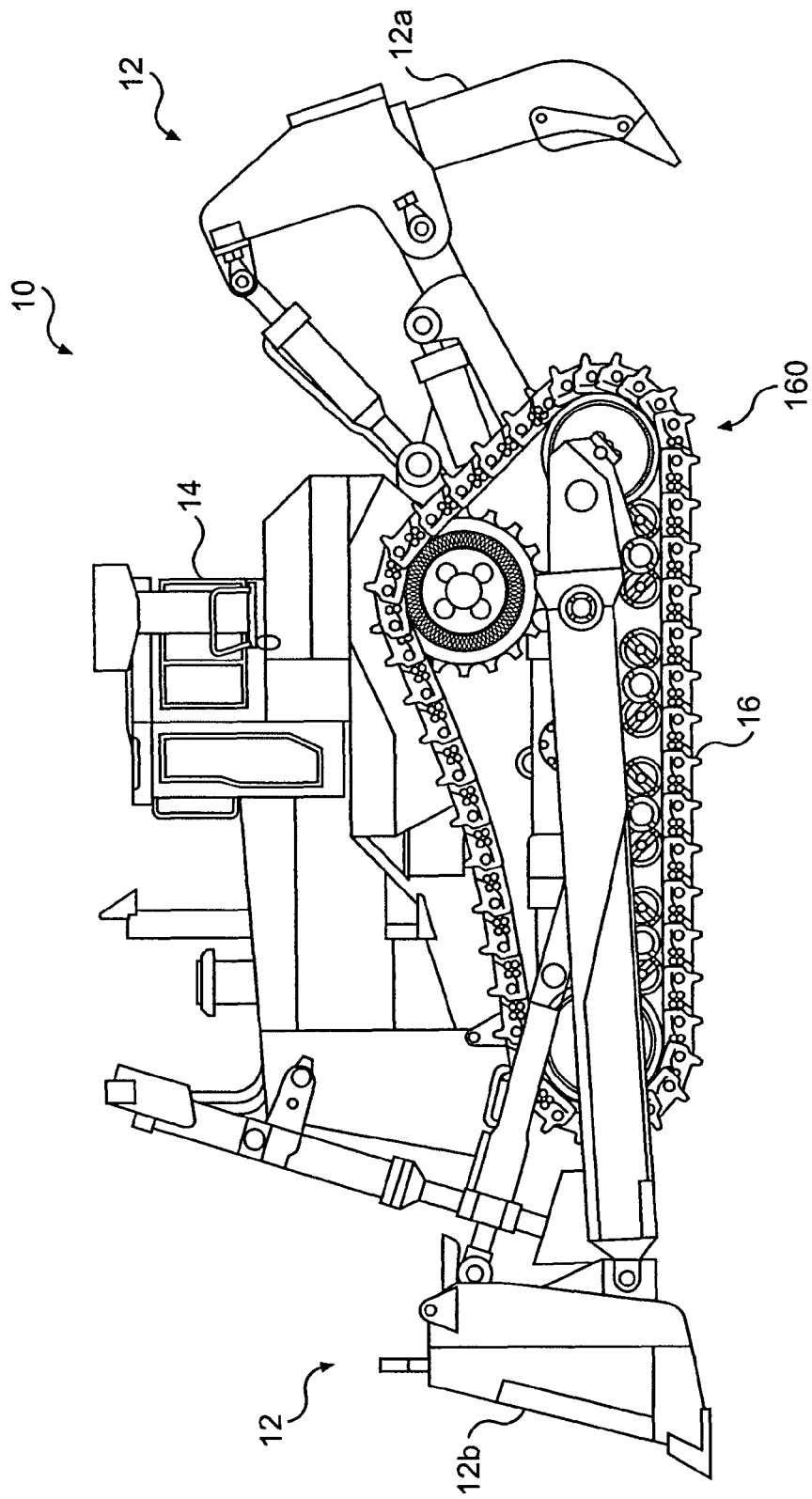
FIG. 1 illustrates an exemplary machine consistent with certain disclosed embodiments.

FIG. 1 illustrates an exemplary machine 10, shown as a track type tractor machine, equipped with implements 12 and capable of performing various operations, such as ripping, grading, and moving material. The machine 10 may include an operator's cab 14 wherein an operator is positioned to operate the machine 10. Although the implements 12 are shown as being a ripper 12a and a dozing blade 12b, it should be understood that any type of implements (e.g., buckets, forks, etc.) or none at all may be implemented and used by the machine 10.

The machine 10 may also include a travel mechanism 16 that engages the ground and that is capable of operating in forward and reverse on level or sloped terrains. The travel mechanism 16 may represent one or more types of mechanical components that allow the machine 10 to travel on a surface of a type of terrain (i.e., earth surface terrain, subterranean surfaces, underwater surfaces, etc.). Such components may include wheels, axles, tracks, sprockets associated with tracks, etc. In the exemplary embodiment shown in FIG. 1, the travel mechanism 16 of the machine 10 is represented as tracks.

Further, although the machine 10 is shown as a track type tractor machine, the machine 10 may be any type of mobile machine that performs at least one operation associated with a particular industry, such as mining, construction, farming, etc., and operates between or within work environments (e.g., construction site, mine site, power plant, etc.). The machine 10 may also be a mobile machine for use in non-industrial settings (e.g., machines for personal use). For example, the machine 10 may represent a commercial machine, such as a wheel loader, a truck, a crane, an earth moving vehicle, a mining vehicle, a backhoe, material handling equipment, farming equipment, a marine vessel, aircraft, an excavator, a dozer, a loader, a motor grader, a dump truck, and other types of machines that operate in a commercial or industrial environment. The machine 10 may be a machine having a continuously variable transmission system, a hybrid system, a hybrid-electric system, etc. In one embodiment, the machine 10 is an electric drive machine that includes an electric motor that provides at least some power to a drive train of the machine 10.

Figure 2:
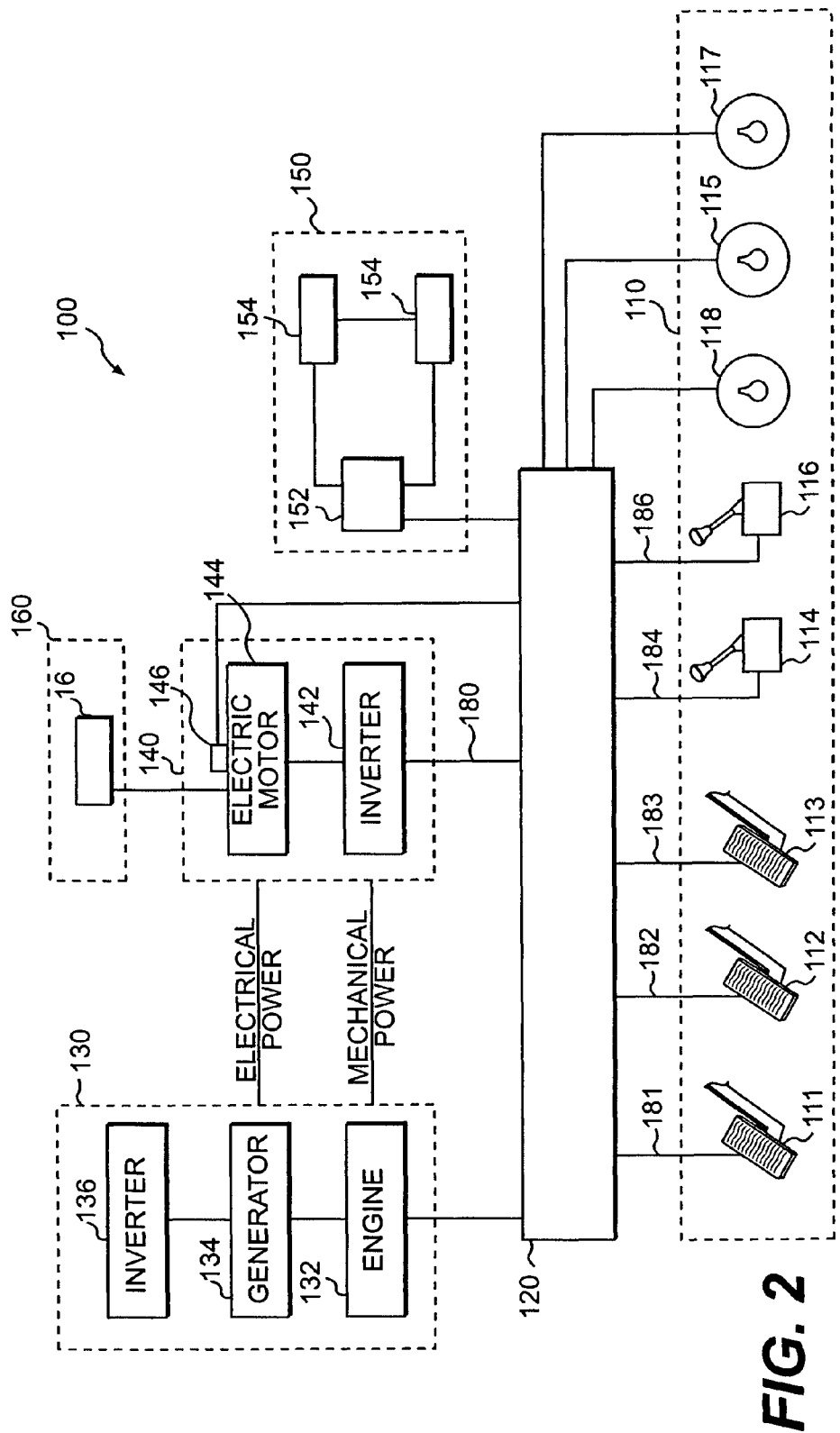
FIG. 2 is a block diagram illustrating an electric drive system of the machine of FIG. 1 in accordance with an exemplary embodiment of the present disclosure.

FIG. 2 schematically illustrates an exemplary electric drive system 100 of the machine 10. The electric drive system 100 may be used in any type of machine that includes a mechanism for propelling the machine 10, such as the travel mechanism 16. As shown in FIG. 2, the electric drive system 100 may include an operator input system 110, a machine control system 120, a power source 130, a transmission system 140, a brake system 150, and a work system 160.

The operator input system 110 provides one or more input signals to the machine control system 120 and allows an operator to control the operation of one or more components of the electric drive system 100 using one or more control devices known in the art, such as one or more pedals, switches, dials, paddles, etc. In the exemplary embodiment shown in FIG. 2, the operator input system 110 includes three pedals 111, 112, 113, a gear selector 114, and optionally, another selector 116 and a throttle lock control device 118. The optional selector 116 may be a forward-neutral-reverse (FNR) selector, or an in-gear (forward/reverse) or out-of-gear (neutral) selector, as described below. The operator input system 110 may also include a mode selector switch 115 and an aggressiveness selector 117. The operator uses the pedals 111, 112, 113 and the selectors 114, 116 to control the output from the power source 130, the transmission system 140, and/or the brake system 150. The interpretation of the input signals received by the machine control system 120 from the operator input system 110 to control the power source 130, the transmission system 140, and/or the brake system 150 is described below.

The machine control system 120 receives the input signal(s) from the operator input system 110 and represents one or more systems, devices, and/or mechanisms configured to perform certain control functions for the machine 10 and/or components of the machine 10. The machine control system 120 may be implemented by one or more hardware, software, and or firmware components. In certain embodiments, the machine control system 120 may be an Electronic Control Module (ECM) embedded in the machine 10, although other forms of control modules may be implemented. The machine control system 120 may receive sensor signals from one or more sensors within the machine 10 and produce commands for controlling one or more other elements of the machine 10, including other control systems. In the exemplary embodiment, the machine control system 120 is capable of outputting control signals to, for example, the power source 130, the transmission system 140, and/or the brake system 150.

The power source 130 receives a control signal from the machine control system 120 and supplies power to the transmission system 140. The control signal may include, for example, an engine control command such as an engine speed command. The power source 130 can be an engine, a battery, or any other appropriate power source for supplying energy to the transmission system 140 to drive work system 160. In the exemplary embodiment of FIG. 2, the power source 130 includes an engine 132 that is mechanically coupled to provide power to a generator 134. The engine 132 receives the engine control command from the machine control system 120 and provides power for the machine 10 and its components, such as the generator 134. The engine 132 may be a diesel engine (although other types of engines are contemplated, such as a gasoline or gaseous fuel driven engine) that generates and transfers power to the components of machine 10 through a power transfer mechanism, such as a shaft.

The generator 134 may be of any appropriate type, for example, AC induction, switched reluctance, or permanent magnet type, and may supply generated current over an alternating current (AC) or a direct current (DC) bus to provide power to one or more components of the transmission system 140, as described below. The generator 134 may include power electronics, such as an inverter 136 or other appropriate hardware and software for controlling the operation of the generator 134, as is known in the art.

The brake system 150 also receives a control signal from the machine control system 120. The control signal may include, for example, a brake control command for controlling a brake control device 152, e.g., a brake valve that regulates fluid flow to control the engagement of at least one brake 154. Each brake 154 may be coupled to respective wheels or sprockets (not shown) of the travel mechanism 16 of the work system 160.

The transmission system 140 also receives a control signal from the machine control system 120 that may include, for example, a motor output torque command 180. The transmission system 140 may be a continuously variable transmission, such as a parallel path transmission, a split torque transmission, a hydrostatic transmission, a hydromechanical transmission, a hydraulic pump and motor, an inverter and electric motor, or any other type of well-known continuously variable transmission. In the exemplary embodiment of FIG. 2, the transmission system 140 includes an inverter 142 and an electric motor 144. Alternatively, the machine 10 may include a hybrid drive or any other device adapted to drive the work system 160.

The inverter 142 contains power electronics that control the output speed and torque of the motor 144. The motor 144 may also include power electronics and is a motor that transfers the electric power received from the generator 134 into power that drives the work system 160. In the exemplary embodiment, the motor 144 may be mechanically coupled to the travel mechanism 16 to provide a driving force to wheels or sprockets of the machine 10. Thus, the inverter 142 and the motor 144 use the motor output torque command 180 to generate a motor output torque, which is output from the transmission system 140 and applied to the work system 160, which represents the load on the motor 144, e.g., the travel mechanism 16 used to propel the machine 10.

In one embodiment, the machine control system 120 may determine a motor speed or a ground speed of the machine 10 through one or more sensors 146. For example, as the machine 10 travels across a terrain surface, the sensor 146 may sense the output speed of the motor 144 and/or may collect ground speed information from the travel mechanism 16 indicating the ground speed. The sensor 146 may send this information to the machine control system 120. Alternatively, the machine 10 may implement different techniques and components for determining the motor speed and/or the ground speed.

The motor output torque command 180 is generated based on the input signals 181, 183, 184, 186 generated by the first and third pedals 111, 113, and the selectors 114, 116. The determination of the motor output torque command 180 based on these input signals 181, 183, 184, 186 will now be described in connection with FIGS. 3-7.

In one embodiment of the electric drive system 100, the operator input system 110 is configured such that the electric drive system 100 may be controlled by the operator in a similar way as for a conventional mechanical drive system. The operator may use the input devices of the operator input system 110, e.g., the pedals 111, 112, 113, the gear selector 114, and the selector 116, which is a forward-neutral-reverse (FNR) selector, in a similar way in which the operator operates pedals, a gear selector, and a FNR selector of the conventional mechanical drive system to produce a similar output to a work system.

The operator may use the gear selector 114 to select between various "gears" (e.g., first, second, third, n-th gear, etc.) or modes of operation corresponding to predetermined speed ranges of the transmission system 140. The predetermined speed ranges are set by speed limit set points B, C, D (FIG. 6) described below. Since the transmission system 140 is continuously variable and is not limited to a finite number of possible gear ratios, gear selection is not necessary. Therefore, in this exemplary embodiment, the gear selector 114 allows the operator to impose the predetermined speed ranges at one or more fictional "gears" or modes of operation as described below. The predetermined speed ranges may simulate speed ranges typically associated with gears of a mechanical transmission. Alternatively, the speed limit set points of the predetermined speed ranges may be set arbitrarily. Furthermore, in this embodiment, the FNR selector 116 allows the operator to select between different directions of travel (e.g., forward, neutral, reverse, etc.). As a result, the gear selector 114 and the FNR selector 116 may send respective input signals 184, 186 to the machine control system 120 to control the speed and direction of travel of the travel mechanism 16 of the work system 160, as described below.

In the exemplary embodiment, the first pedal 111 acts like an impeller clutch pedal and is typically the left pedal, the second pedal 112 is a brake pedal and is typically the center pedal, and the third pedal 113 is an engine speed pedal and is typically the right pedal. The first and third pedals 111, 113 are moveable between respective minimum and maximum positions for producing respective input signals 181, 183 indicative of the positions of the first and third pedals 111, 113. The input signals 181, 183 from the first and third pedals 111, 113 are received by the machine control system 120, which processes the input signals 181, 183, 184, 186 from the first and third pedals 111, 113, the gear selector 114, and the FNR selector 116 to determine the motor output torque command 180. The machine control system 120 sends the motor output torque command 180 to the transmission system 140 to operate the motor 144. The input signal 183 from the third pedal 113 is also received by the machine control system 120, which sends an engine speed signal to the engine 132 to control its output speed.

The second pedal 112 is moveable between a minimum and a maximum position for producing an input signal 182 indicative of the position of the second pedal 112. The input signal 182 from the second pedal 112 is received by the machine control system 120, which sends the brake control command to the brake control device 152 to operate the brakes 154.

Figure 3:
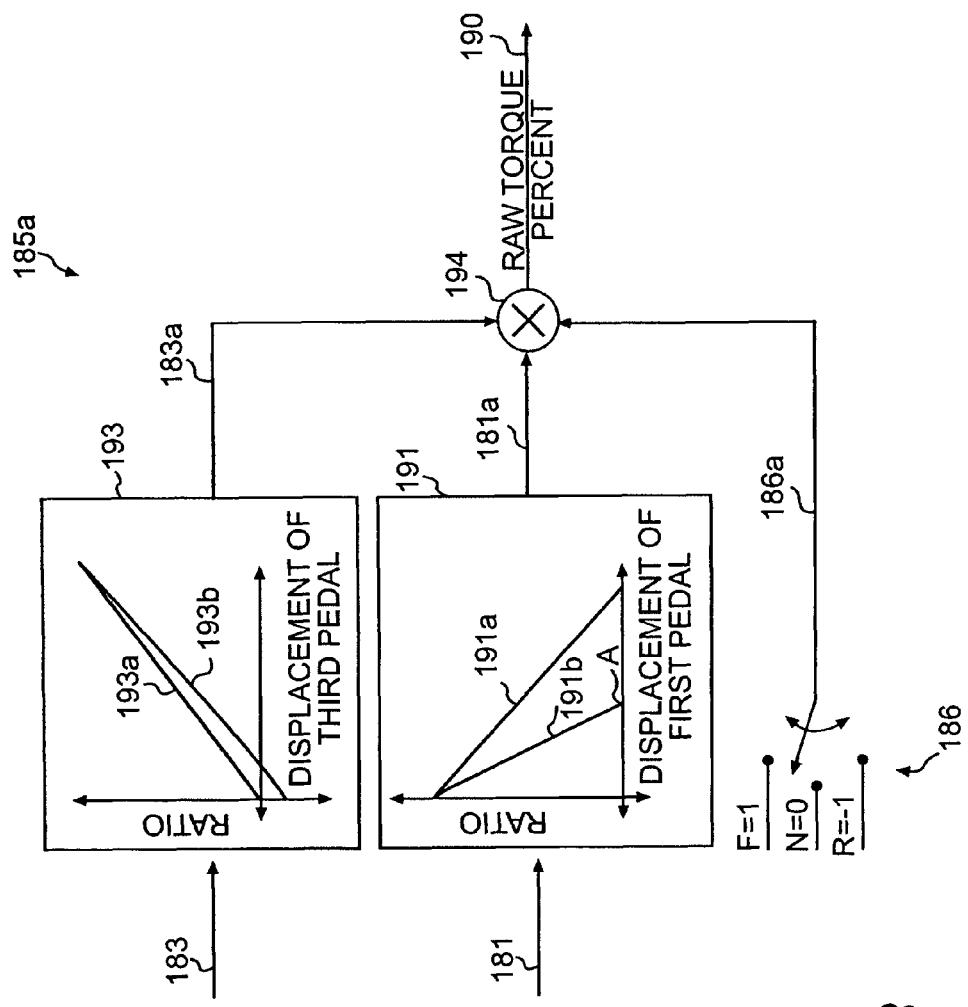
FIG. 3 is a schematic representation of a raw torque percent control system in accordance with an exemplary embodiment of the present disclosure.

FIG. 3 is a schematic representation of a raw torque percent control system 185*a* of the machine control system 120 of the exemplary electric drive system 100 that emulates the conventional mechanical drive system. The raw torque percent control system 185*a* determines a raw torque value, such as a raw torque percent 190, that is used to determine the motor output torque command 180 transmitted to the motor 144.

The first pedal input signal 181 is used to determine a first value 181*a* that represents a displacement ratio or relative displacement of the first pedal 111. For example, the first value 181*a* may be determined using a predetermined correlation between the first value 181*a* and the relative displacement of the first pedal 111, such as a ratio versus pedal displacement plot 191. As shown in FIG. 3, the predetermined relationship may be linear, and the first value 181*a* may vary from 1 (or another positive value alternatively) to 0 as the pedal displacement varies from zero displacement to maximum displacement, as indicated by plot 191*a*. Thus, the first value 181*a* decreases in magnitude (absolute value) as the first pedal 111 is moved toward maximum displacement.

The third pedal input signal 183 is used to determine a second value 183*a* that represents a displacement ratio or relative displacement of the third pedal 113. For example, the second value 183*a* may be determined using a predetermined correlation between the second value 183*a* and the relative displacement of the third pedal 113, such as a ratio versus pedal displacement plot 193. As shown in FIG. 3, the predetermined relationship may be linear, and the second value 183*a* may vary from 0 to 1 (or another positive value alternatively) as the pedal displacement varies from zero displacement to maximum displacement, as indicated by plot 193*a*, or may vary from some negative value to 1 (or another positive value alternatively) as the pedal displacement varies from zero displacement to maximum displacement, as indicated by plot 193b. Thus, the second value 183a increases in magnitude (absolute value) as the third pedal 113 is moved toward maximum displacement.

Alternatively, the actuation of the first pedal 111 may activate the brakes 154 to give the operator the feeling that the first pedal 111 is coupled to the brakes 154, which is similar to the operation of a conventional mechanical transmission. In this aspect, the slope of a ratio versus pedal displacement plot 191b associated with the first pedal 111 may be steeper than the slope of the ratio versus displacement plot 193a, 193b associated with the third pedal 113. As a result, at a pedal displacement of the first pedal 111 that is between the minimum and maximum displacement of the first pedal 111, such as at point A, the second value 181a equals 0, and the machine control system 120 sends the brake control command to the brake control device 152 to engage the brakes 154. The operator may then press down further on the first pedal 111 until the first pedal 111 is at maximum displacement to apply the brakes 154 with a higher degree of force. In addition, the operator may also activate the brakes 154 using the second pedal 112. In a further embodiment, the brakes 154 may be activated by the first pedal 111 as described above, and the second pedal 112 may be removed.

The input signal 186 from the FNR selector 116 is used to determine a third value 186a, which is a numerical representation of the FNR selector input signal 186. For example, as shown in FIG. 3, the third value 186a may equal 1 if the operator selects "F" (forward), 0 if the operator selects "N" (neutral), or −1 if the operator selects "R" (reverse). At modifier 194, the first, second, and third values 181a, 183a, 186a are multiplied. The output from modifier 194 represents the raw torque percent 190. In the exemplary embodiment, the raw torque percent 190 may range from −100% to 100%.

Figure 4:
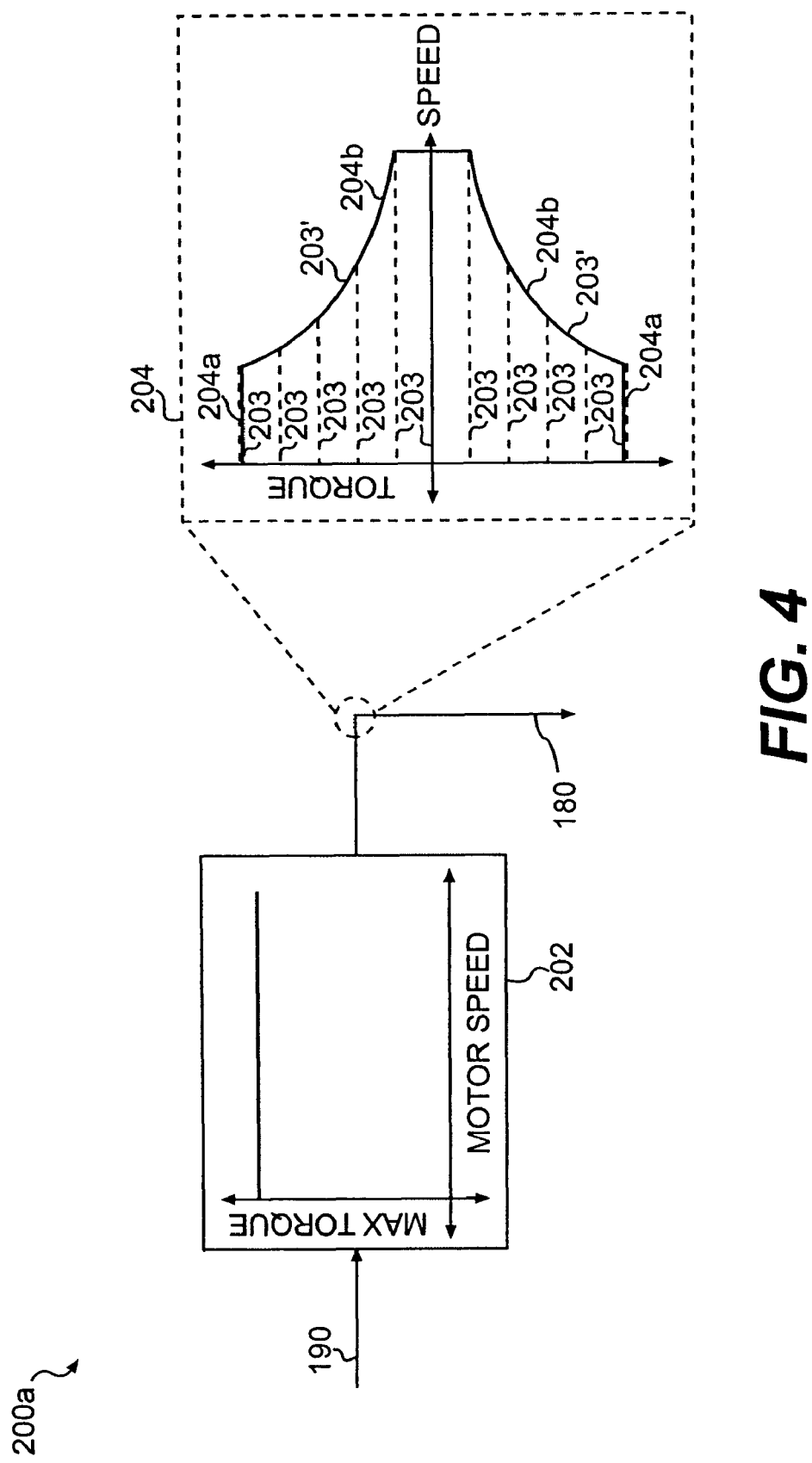
FIG. 4 is a schematic representation of a torque command control system in accordance with an exemplary embodiment of the present disclosure.
Figure 5:
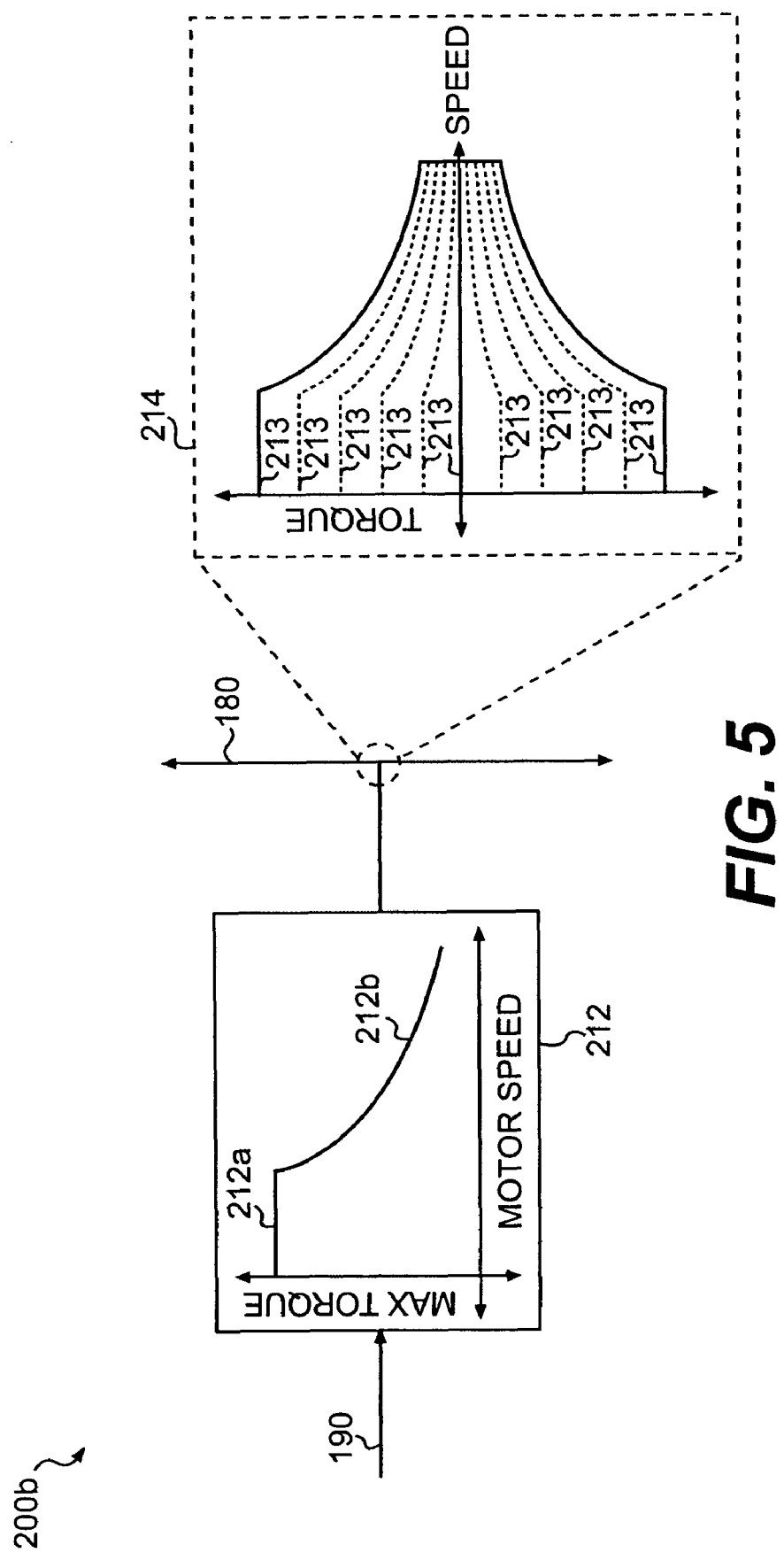
FIG. 5 is a schematic representation of a torque command control system in accordance with another exemplary embodiment of the present disclosure.

FIGS. 4 and 5 show alternative torque command control systems 200a, 200b that use the raw torque percent 190 to determine the motor output torque command 180 transmitted to the motor 144. FIG. 4 is a schematic representation of the torque command control system 200a that determines the motor output torque command 180 using a percent constant transform 202. The percent constant transform 202 is represented as a maximum torque value that is constant with respect to motor speed. The percent constant transform 202 is multiplied by the raw torque percent 190, and the result is a percentage of the percent constant transform 202. The dashed lines 203 represent a number of different results of multiplying the percent constant transform 202 with different raw torque percentages 190, i.e., different percentages of the percent constant transform 202. However, it is to be understood that, since the raw torque percentage 190 may vary, the possible results from multiplying the raw torque percentage 190 with the percent constant transform 202 are not limited to these illustrated dashed lines 203.

As shown in FIG. 4, the dashed line 203 is modified based on a predetermined correlation between a maximum amount of torque that the motor 144 is capable of outputting at different motor speeds, such as a torque versus speed curve 204. In the exemplary torque versus speed curve 204 shown in FIG. 4, the motor 144 operates in a "torque limited region" 204a at lower speeds so that the motor 144 is limited by a constant maximum torque level. The motor 144 operates in a "constant power region" 204b at higher speeds so that the motor 144 outputs a constant output power when operating at its maximum torque as the motor speed varies. Since the torque versus speed curve 204 represents a maximum torque for the motor 144, a portion 203' of the dashed line 203 starts to follow the torque versus speed curve 204 when the motor speed increases beyond the intersection of the dashed line 203 and the torque versus speed curve 204. The motor output torque for the motor output torque command 180 is a torque value on the dashed line 203, which includes portion 203', corresponding to the sensed motor speed from the sensor 146. Alternatively, the sensed motor speed may be converted by scaling it or performing other well-known processing or conversion operations.

FIG. 5 is a schematic representation of an alternate torque command control system 200b of the machine control system 120 of the exemplary electric drive system 100. This alternate torque command control system 200b determines the motor output torque command 180 using a percent limit transform 212. The percent limit transform 212 is represented by a predetermined correlation between a maximum amount of torque that the motor 144 is capable of outputting at a given speed of the motor 144, such as a torque versus speed curve, as described above, having a torque limited region 212a at lower speeds and a constant power region 212b at higher speeds.

The percent limit transform 212 is multiplied by the raw torque percent 190, and the result is a percentage of the percent limit transform 212. The dashed lines 213 represent a number of different results of multiplying the percent limit transform 212 with different raw torque percentages 190, i.e., different percentages of the percent limit transform 212. However, it is to be understood that, since the raw torque percentage 190 may vary, the possible results from multiplying the raw torque percentage 190 with the percent limit transform 212 are not limited to these illustrated dashed lines 213. The motor output torque for the motor output torque command 180 is a torque value on the dashed line 213 corresponding to the sensed motor speed from the sensor 146. Alternatively, the sensed motor speed may be converted by scaling it or performing other well-known processing or conversion operations.

A gear shifting simulation feature may be used by the machine control system 120 to allow the machine 10 to simulate the gear shifting function of a conventional mechanical transmission system by limiting the motor output torque calculated by the torque command control system 200a, 200b. The gear shifting simulation feature may be used to modify the calculated motor output torque based on the "gear" or mode of operation selected by the operator using the gear selector 114 and based on a predetermined correlation between a propulsion/retarding torque modifying value, such as a torque percent, and the sensed motor speed at a given gear selection from the gear selector 114. Propulsion torque is torque that acts in the same direction as the direction of movement of the machine 10, and retarding torque is torque that acts in the opposite direction as the direction of movement of the machine 10. Therefore, the gear shifting simulation feature uses the sensed motor speed from the sensor 146 to determine when to apply a propulsion torque acting in the machine's direction of motion when the sensed speed is low or a retarding torque acting against the machine's direction of motion when the sensed speed is high. Therefore, the operator may use the gear selector 114 to artificially impose a predetermined speed range on the machine 10, such as the speed ranges typically provided when selecting gear ratios in conventional mechanical transmissions.

Figure 6:
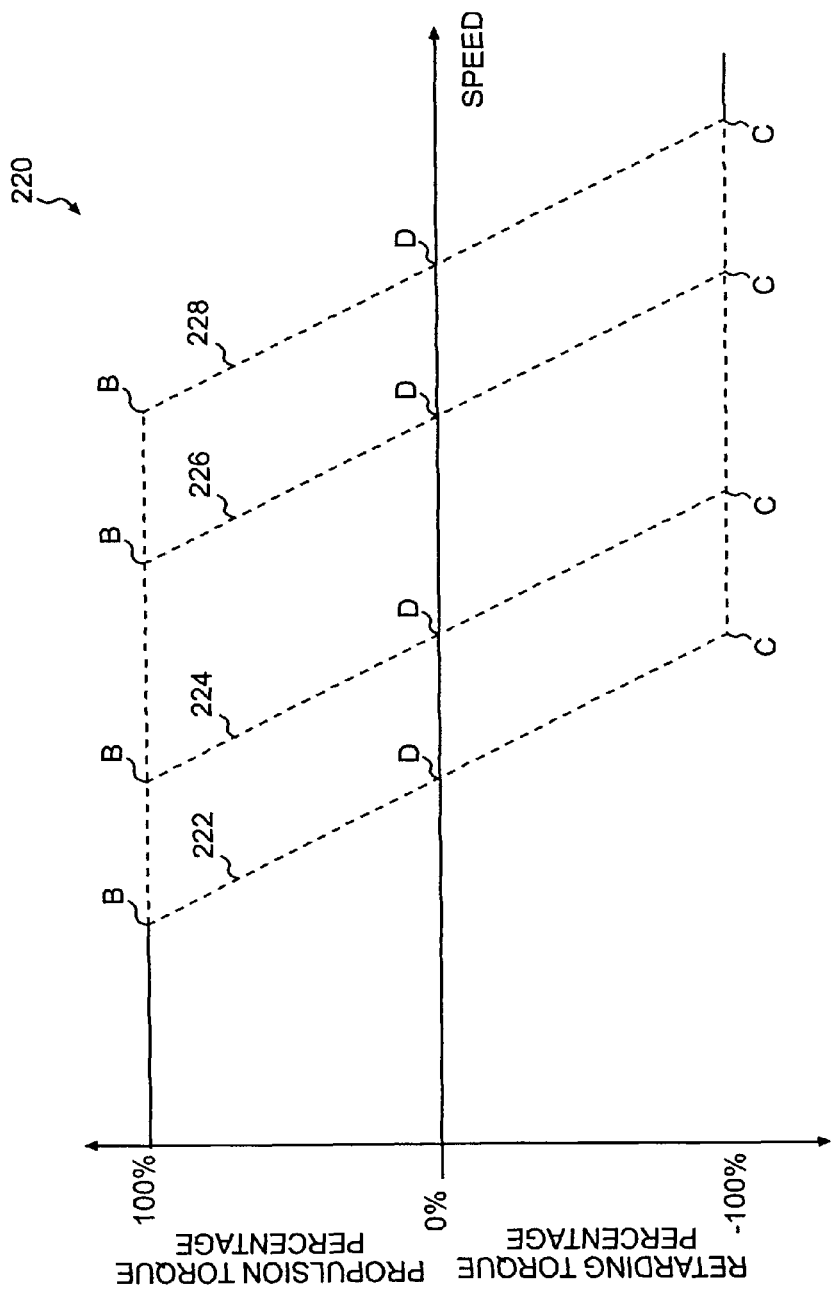
FIG. 6 is a graph illustrating a relationship between a motor speed and a propulsion or retarding torque percentage in accordance with an exemplary embodiment of the present disclosure.

FIG. 6 is an exemplary graph 220 illustrating a relationship between the sensed speed and the propulsion/retarding torque percent for the first through n-th modes of operation associated with the respective predetermined speed limit set points B, C, D. The input signal 184 from the gear selector 114 indicates which mode of operation (e.g., corresponding to a simulated first gear, second gear, third gear, fourth gear, n-th gear, etc., corresponding to arbitrary predetermined speed limit set points, etc.) is selected by the operator. The graph 220 of FIG. 6 illustrates the torque percent versus motor speed plots for the first mode of operation 222, second mode of operation 224, third mode of operation 226, and fourth mode of operation 228. The speeds associated with one or more of the speed limit set points B, C, D may be set manually by the operator using a selector (not shown), such as a pedal, dial, or switch. Alternatively, the speeds associated with one or more of the speed limit set points B, C, D may be determined based on the pedal displacements of the first and third pedals 111, 113. For example, the speed associated with the speed limit set point B may decrease as the operator pushes down on the first pedal 111 and/or lifts up on the third pedal 113, thereby decreasing the slope of the graph shown in FIG. 6 between points B and D. The speed associated with the speed limit set point B may increase as the operator lifts up on the first pedal 111 and/or pushes down on the third pedal 113, thereby increasing the slope of the graph shown in FIG. 6 between points B and D.

The machine control system 120 compares the sensed speed to the graph 222, 224, 226, 228 associated with the mode of operation selected by the operator. For example, if the sensed speed is below a predetermined speed (at point D), then the motor 144 receives a motor output torque command to apply a propulsion torque in the same direction as the direction of movement of the machine 10. The exact percentage of the propulsion torque is determined based on the sensed speed and the graph 220. If the sensed speed is less than a minimum motor speed for the given operator-selected mode of operation (at point B), then the result is 100% of commanded propulsion torque. The motor 144 receives a motor output torque command to apply 100% of the motor output torque calculated using the torque command control system 200a, 200b in the same direction as the direction of movement of the machine 10.

On the other hand, if the sensed speed is above the predetermined speed (at point D), then the motor 144 receives a motor output torque command to apply a retarding torque in the opposite direction of the direction of movement of the machine 10. The exact percentage of the retarding torque is determined based on the sensed speed and the graph 220. If the sensed speed is greater than a maximum motor speed for the given operator-selected mode of operation (at point C), then the result is 100% retarding torque. The motor 144 receives a motor output torque command to apply 100% of the motor output torque in the opposite direction to the direction of movement of the machine 10.

Figure 7:
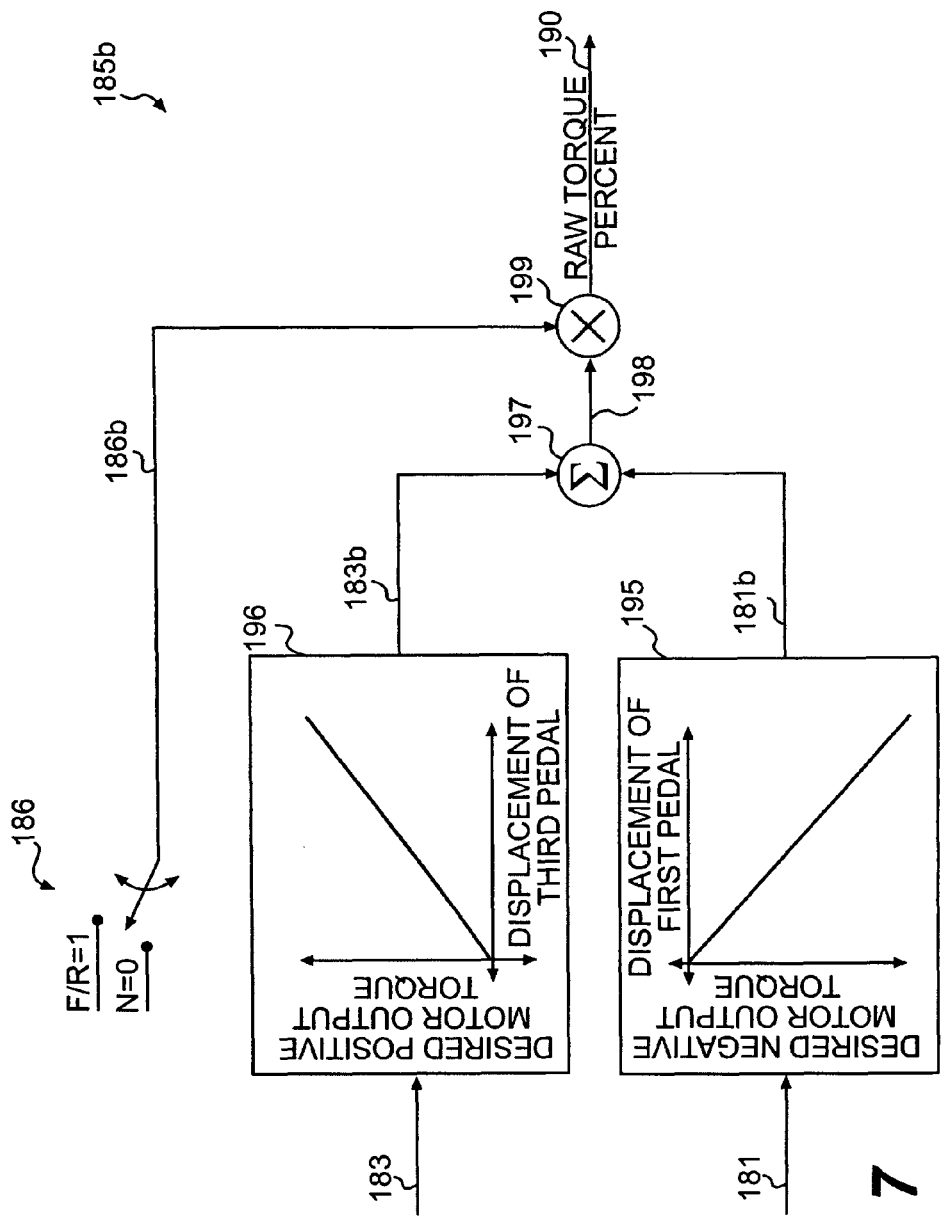
FIG. 7 is a schematic representation of a raw torque percent control system in accordance with another exemplary embodiment of the present disclosure.

In another embodiment of the electric drive system 100, the operator input system 110 is configured such that the first pedal 111 is used to control an amount of negative motor output torque applied by the motor 144 and the third pedal 113 is used to control an amount of positive motor output torque applied by the motor 144. In this embodiment, the operation of the first pedal 111 is independent from the brakes 154. The brakes 154 may be activated using the second pedal 112. Furthermore, in this embodiment, the selector 116 is a in-gear/out-of-gear selector that allows the operator to select between allowing forward or reverse movement when selecting "in-gear" and being in neutral when selecting "out-of-gear." FIG. 7 is a schematic representation of an alternate raw torque percent control system 185b that determines the raw torque percent 190 that is used to determine the motor output torque command 180 transmitted to the motor 144 according to this embodiment.

The first pedal input signal 181 is used to determine a first value 181b that represents a desired negative motor output torque based on the relative displacement of the first pedal 111. For example, the first value 181b may be determined using a predetermined correlation between the first value 181b and the displacement of the first pedal 111, such as a desired negative motor output torque versus pedal displacement plot 195. As shown in FIG. 7, the predetermined relationship may be linear, and the first value 181b may vary from 0 to −1 (or another negative value alternatively) as the pedal displacement varies from zero displacement to maximum displacement. Thus, the first value 181b increases in magnitude (absolute value) as the first pedal 111 is moved toward maximum displacement.

The third pedal input signal 183 is used to determine a second value 183b that represents a desired positive motor output torque based on the relative displacement of the third pedal 113. For example, the second value 183b may be determined using a predetermined correlation between the second value 183b and the displacement of the third pedal 113, such as a desired positive motor output torque versus pedal displacement plot 196. As shown in FIG. 7, the predetermined relationship may be linear, and the second value 183b may vary from 0 to 1 (or another positive value alternatively) as the pedal displacement varies from zero displacement to maximum displacement. Thus, the second value 183b increases in magnitude (absolute value) as the third pedal 113 is moved toward maximum displacement. At modifier 197, the first and second values 181b, 183a are summed. The sum represents a total desired motor output torque 198. In the exemplary embodiment, the total desired motor output torque 198 may range from −1 to 1.

The input signal 186 from the in-gear/out-of-gear selector 116 is used to determine a third value 186b, which is a numerical representation of the in-gear/out-of-gear selector input signal 186. For example, as shown in FIG. 7, the third value 186b may equal 1 if the operator selects "F/R" (forward/reverse or in-gear) or 0 if the operator selects "N" (neutral or out-of-gear). At modifier 199, the third value 186b and the total desired motor output torque 198 are multiplied. The result represents the raw torque percent 190. In this exemplary embodiment, the raw torque percent 190 may range from −100% to 100%. The torque command control systems 200a, 200b described above may use the raw torque percent 190 calculated using the raw torque percent control system 185b shown in FIG. 7 to determine the motor output torque command 180 transmitted to the motor 144.

The electric drive system 100 may also operate in a throttle lock mode, which may be activated by the operator using the throttle lock control device 118 (FIG. 2) that includes, e.g., a button, knob, switch, etc., connected to the machine control system 120. In the throttle lock mode, the third pedal 113 no longer controls the engine speed. That is, in this embodiment, the machine control system 120 does not determine the engine speed command based on the displacement of the third pedal 113. Instead, when throttle lock mode activated using the throttle lock control device 118, the engine speed is locked at a given speed, e.g., the engine speed at the time the operator locked the throttle. The engine speed is held constant until the throttle lock mode is deactivated using the throttle lock control device 118. Alternatively, the operator may use the throttle lock control device 118 to vary the engine speed while the throttle lock mode is activated. The engine speed may be adjusted independently from the motor speed by varying the ratio of the continuously variable transmission system 140. The machine control system 120 determines the desired ratio based on the sensed motor speed, which is determined using the sensor 146, and the desired engine speed, which is determined using the throttle lock control device 118. Then, the machine control system 120 may send to the transmission system 140 an output signal that includes the calculated transmission ratio. As a result, the operator may use the input devices described above to control the motor speed while separately controlling the engine speed using the throttle lock control device 118.

INDUSTRIAL APPLICABILITY

The disclosed operator interface may be applicable to any machine that includes a continuously variable transmission. The disclosed operator interface for a machine with a continuously variable transmission may emulate a conventional operator interface for a machine with a mechanical transmission according to one exemplary embodiment. According to another exemplary embodiment, the operator interface for a machine with a continuously variable transmission may provide a simpler, easy to use interface in which one pedal controls forward torque and another pedal controls reverse torque. The system and method for controlling the machine with the continuously variable transmission using the disclosed operator interface will now be explained.

The operator interface includes three pedals 111, 112, 113, and there are at least two methods for configuring the three pedals 111, 112, 113 to allow the operator to control the operation of the machine 10. According to one embodiment, the three pedals 111, 112, 113 may emulate the pedals of a conventional mechanical drive based machine. That is, the first pedal 111 acts similar to a conventional impeller clutch pedal of a mechanical drive-based machine by reducing the power transmitted to the work system 160 to slow the machine 10. The second pedal 112 is a brake pedal which controls the actuation of one or more of the brakes 154 to slow the machine 10. The third pedal 113 acts similar to an engine speed pedal by adjusting the engine speed. The first pedal 111 may also be used to actuate the brakes 154 when the pedal 111 is displaced beyond a certain limit. In this embodiment, the motor output torque command 180 for controlling the output torque of the motor 144 is determined based on a multiplication of signals 181a, 183a, 186a (FIG. 3) corresponding to the amount of pedal displacement of the first and third pedals 111, 113 and a selection of the FNR selector 116 and on a maximum torque versus speed plot 204, 212 (FIGS. 4-5) for the motor 144. As a result, depression of the first pedal 111 in the electric drive system 100 produces a similar result as the depression of the impeller clutch pedal in a mechanical drive system by allowing the operator to control the ground speed of the machine 10 without having to alter engine speed. Furthermore, in one aspect, the first pedal 111 may trigger the activation of the brakes 154 when depressed far enough. This is also similar to an impeller clutch pedal that is coupled to the brake pedal of a mechanical drive system.

The torque command control system 200b shown in FIG. 5 allows for more finely tuning the motor output torque based on the raw torque percent 190. For example, at high speeds, the motor output torque may be finely adjusted based on the pedal displacements of the first and third pedals 111, 113 regardless of whether the raw torque percent 190 is 20% or 100%.

In another embodiment, the second pedal 112 acts as the sole brake pedal. A motor output torque command 180 for controlling the output torque of the motor 144 is determined based on a summation of signals 181b, 183b (FIG. 7) corresponding to the amount of pedal displacement of the first and third pedals 111, 113, a selection of the in-gear/out-of-gear selector 116, and a maximum torque versus speed plot 204, 212 (FIGS. 4-5) for the motor 144. The displacement of the first pedal 111 produces a negative or zero signal 181b, and the displacement of the third pedal 113 produces a positive or zero signal 183b. Therefore, a FNR selector is unnecessary in this embodiment since a positive summation result produces forward movement and a negative summation result produces reverse movement. As a result, the first pedal 111 may provide regenerative braking, i.e., the production of retarding torque that acts against the acceleration of the machine 10. For example, when the first pedal 111 is displaced, there is a corresponding subtraction of displacement of the third pedal 113. When the first pedal 111 is displaced further to provide a negative summation result, the first pedal 111 forces the motor 144 to produce the retarding torque that further acts against the acceleration of the machine 10, such as when the machine 10 is moving in an undesired speed and/or direction, e.g., when traveling down an inclined slope or just after the initiation of a directional shift of the machine 10 from a reverse direction to a forward direction, or vice versa.

Since the FNR selector is unnecessary in this embodiment, the operator does not have to use hands to control whether the machine 10 moves forward or backward. Instead, the operator may control the direction of movement by using the foot pedals, and the operator's hands may be free to control other input devices for controlling the implements 12 on the machine 10.

The gear selector 114 may be used in the exemplary embodiments described above to artificially impose a speed limit on the machine 10 for different modes of operation corresponding to "gears" that may be selected by the operator, thereby emulating a machine with a conventional mechanical drive system having a finite number of gear ratios. The motor output torque command may be modified based on a motor speed versus propulsion/retarding torque percent plot (FIG. 6) for each "gear" selection. As a result, the motor output torque may be reduced (or may become a negative or retarding torque) if the machine speed exceeds a certain limit. The operator may impose predetermined speed ranges corresponding to each "gear" or mode of operation.

With the throttle lock feature, engine speed may be fixed at a high speed to be able to complete certain operations, such as moving a bucket or operating other implements 12, while motor speed may be controlled separately. For example, the machine 10 may include a hydraulic pump that pumps oil for a hydraulic system that operates the bucket. If the engine speed is too low, the hydraulic pump may be unable to pump enough fluid to move the bucket or may only allow the bucket to move at slow speeds. Therefore, by using the throttle lock feature, the operator may maintain a high engine speed for longer periods of time to operate the implements 12 on the machine, e.g., so that the operator may move the bucket as desired during the extended time period while also separately controlling the motor or ground speed.

It will be apparent to those skilled in the art that various modifications and variations can be made to the operator interface for a machine with a continuously variable transmission. Other embodiments will be apparent to those skilled in the art from consideration of the specification and practice of the disclosed operator interface for a machine with a continuously variable transmission. It is intended that the specification and examples be considered as exemplary only, with a true scope being indicated by the following claims and their equivalents.

What is claimed is:

1. A system for controlling a machine with a continuously variable transmission, the system comprising:
   a first control device configured to produce a first signal based on a first operator input;
   a second control device configured to produce a second signal based on a second operator input; and
   a control system configured to:
      receive the first and second signals from the first and second control devices,
      generate a raw torque value based on the first and second signals,
      determine an output torque value based on the raw torque value, and
      transmit the output torque value to the transmission to control the transmission.

2. The system of claim 1, wherein the second signal indicates a desired engine speed.

3. The system of claim 2, wherein:
   the first control device includes a first pedal;
   the second control device includes a second pedal;
   the first signal produces a first value that decreases in magnitude as the first pedal moves toward a maximum displacement;
   the second signal produces a second value that increases in magnitude as the second pedal moves toward a maximum displacement; and
   the raw torque value is based on a multiplication of the first value and the second value.

4. The system of claim 2, further including:
   a selector configured to receive an input from an operator, the operator input specifying a desired direction of movement, the selector being configured to produce a third signal based on the operator input, and
   the raw torque value is based on a multiplication of the first signal, the second signal, and the third signal.

5. The system of claim 1, wherein:
   the first control device includes a first pedal; and
   the control system sends a brake command signal to a brake control device when the first pedal reaches a predetermined displacement.

6. The system of claim 1, wherein the first signal indicates a desired reverse torque and the second signal indicates a desired forward torque.

7. The system of claim 6, wherein:
   the first control device includes a first pedal;
   the second control device includes a second pedal;
   the first signal produces a first value that increases in magnitude as the first pedal moves toward a maximum displacement;
   the second signal produces a second value that increases in magnitude as the second pedal moves toward a maximum displacement; and
   the raw torque value is based on a summation of the first value and the second value.

8. The system of claim 1, further including:
   a third control device configured to produce a third signal based on a third operator input, and
   the control system is configured to hold constant a desired engine speed until receiving the third signal from the third control device.

9. The system of claim 1, wherein the control system determines the output torque value based on the raw torque value and a predetermined correlation between at least one maximum torque and at least one speed.

10. The system of claim 9, wherein:
    the predetermined correlation between at least one maximum torque and at least one speed is a maximum torque versus speed plot; and
    the control system determines the output torque value based on a multiplication of the raw torque value and at least one torque value from the maximum torque versus speed plot.

11. The system of claim 9, wherein:
    the predetermined correlation between at least one maximum torque and at least one speed is a maximum torque versus speed plot; and
    the control system determines a maximum torque for a motor of the transmission;
    the control system determines the output torque value based on at least one of the maximum torque versus speed plot and a multiplication of the maximum torque for the motor and the raw torque value.

12. The system of claim 1, further including:
    a selector configured to receive an input from an operator, the operator input specifying a desired mode of operation, the mode of operation including a correlation between at least one speed and at least one torque percentage, and
    the control system determines the output torque value based on the mode of operation specified by the operator and a torque percentage determined based on the correlation and a sensed speed.

13. The system of claim 1, further including:
    a third control device configured to produce a third signal based on a third operator input;
    the control system is configured to receive the third signal from the third control device and send a brake command signal to a brake control device based on the third signal, and
    the first, second, and third control devices are foot pedals.

14. The system of claim 1, further including:
    a third control device configured to produce a third signal based on a third operator input; and
    the control system is configured to receive the third signal from the third control device and send a brake command signal to a brake control device based on the third signal.

15. A system for controlling a machine with a continuously variable transmission, the system comprising:
    a selector configured to receive an input from an operator, the operator input specifying a mode of operation, the mode of operation including a correlation between at least one speed and at least one torque modifying value;
    a control system configured to:
       determine an output torque value based on the mode of operation specified by the operator and a torque modifying value determined based on the correlation and a sensed speed; and
       transmit the output torque value to the transmission to control the transmission.

16. The system of claim 15, further including at least one input device configured to receive an input from the operator, and the torque modifying value is based on the operator input.

17. The system of claim 15, wherein the torque modifying value is positive if the sensed speed is below a predetermined speed and negative if the sensed speed is above the predetermined speed.

18. The system of claim 17, wherein the torque modifying value is 100% when the sensed speed is less than a predetermined minimum speed and is −100% when the sensed speed is greater than a predetermined maximum speed.

19. A method of controlling a machine with a continuously variable transmission, the method comprising:
   producing a first signal based on a first operator input, the first signal being associated with a reverse torque;
   producing a second signal based on a second operator input, the second signal being associated with a forward torque;
   determining an output torque value based on the first and second signals; and
   transmitting the output torque value to the transmission to control the transmission.

20. The method of claim 19, comprising:
   generating a raw torque value based on a summation of the first signal and the second signal, and
   the determining of the output torque value is based on the raw torque value.

21. The method of claim 19, wherein the determining of the output torque value is based on multiplying the raw torque value and at least one torque value from a maximum torque versus speed plot for a motor of the transmission.

* * * * *